United States Patent
Howe

(10) Patent No.: US 6,618,590 B1
(45) Date of Patent: Sep. 9, 2003

(54) USE OF MOBILE UNIT TO PROVIDE DELIVERY PATH OPTIMIZATION TO LAND-BASED UNIT

(75) Inventor: Walter Wesley Howe, Alpharetta, GA (US)

(73) Assignee: GTE Wireless Service Corporation, Alpharetta, GA (US)

( * ) Notice: Subject to any disclaimer, the term of this patent is extended or adjusted under 35 U.S.C. 154(b) by 0 days.

(21) Appl. No.: 09/460,173

(22) Filed: Dec. 10, 1999

(51) Int. Cl.[7] .................................................. H04Q 7/20
(52) U.S. Cl. ........................ 455/445; 455/417; 455/461
(58) Field of Search ........................... 370/352; 455/428, 455/435, 445, 461, 405, 406; 379/114.01, 114.02, 114.1, 114.27

(56) References Cited

U.S. PATENT DOCUMENTS

| 5,758,281 A | * | 5/1998 | Emery et al. ................ 455/428 |
| 5,889,774 A | * | 3/1999 | Mirashrafi et al. .......... 370/352 |
| 5,903,833 A | * | 5/1999 | Jonsson et al. ............. 455/417 |
| 5,978,677 A | | 11/1999 | Sawyer ........................ 455/432 |
| 6,125,126 A | * | 9/2000 | Hallenstal ................... 370/522 |

* cited by examiner

Primary Examiner—Nay Maung
Assistant Examiner—Tanmay Lele
(74) Attorney, Agent, or Firm—James K. Weixel

(57) ABSTRACT

An improved telephone system is provided for handling a long distance call made by a mobile modem 5 to a remote land-based terminal 7 as a local call. A register in the system examines the number of the cellular telephone, and the location of the mobile, as represented by the identity of the serving switch. The register then instructs the system to connect the mobile modem 5 to a hard-wired modem 37 local to the visited switch 11. The modem designated is one of a pool of geographically dispersed modems 39 connected to an alternative network 41 such as the TCP/IP based Internet. The call is completed as a local call with data flowing from the mobile modem 5 to the local hard-wired modem 37. From the hard-wired modem 37 the data is then routed over the alternative network 41 to the land-based terminal 7, which is also connected to the alternative network 41. Such an approach eliminates the long distances fee connected with the use of the public switched telephone network 31.

15 Claims, 2 Drawing Sheets

USE OF MOBILE UNIT TO PROVIDE DELIVERY PATH OPTIMIZATION TO LAND-BASED UNIT

FIELD OF THE INVENTION

Figure 1:
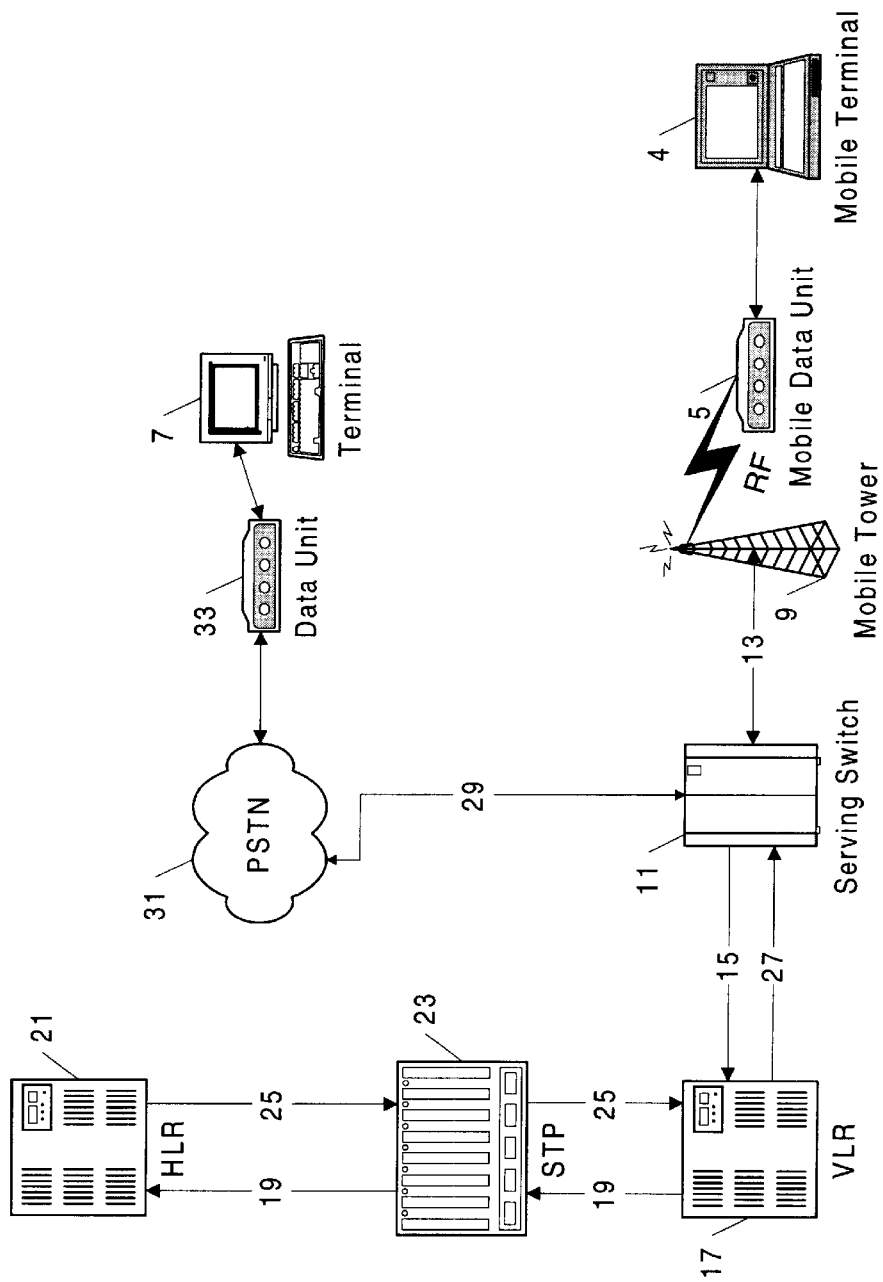

The present invention relates to the use of a mobile modem/phone combination to provide a signal path to a land-based unit at a remote location as a local call that is then re-routed over a non-public switch telephone network to the land-based unit.

BACKGROUND OF THE INVENTION

It is known to activate a wireless data terminal by connecting a mobile terminal such as a notebook computer or personal data device to a specialized mobile modem. The mobile modem has associated wireless mobile telephone capabilities or a separate mobile phone to which it is connected and acts as a mobile data unit, sometimes simply known as a mobile unit. Communication between the mobile unit and a land-based terminal such as a desktop computer connected with a hard-wired modem with a fixed phone number can then be made by using switched-circuit connections, created by using the mobile unit to dial the fixed number located on the public switch telephone network ("PSTN") associated with the hard-wired modem. Thus, the current art requires one hard-wired modem and one hard-wired telephone circuit per land-based terminal.

In a hard-wired telephone network a specific telephone number is associated with only one serving switch, located at a specific geographic location. In a wireless network a specific mobile number for a wireless mobile modem or mobile modem/phone combination acting as a mobile unit may be served by any single one of a vast number of available switches depending on the specific geographic location of the mobile unit at the time a call is made. Such portability of use is one of the basic hallmarks of wireless telephony.

In the present implementation of wireless networks, each mobile number is associated by both the wireless and hard-wired networks with a specific geographic home switch location. The home switch location includes a physical connectivity matrix and a stored program control section that houses the logic and algorithms necessary to control the connectivity. Associated with wireless switches is a collection of Radio Frequency (RF) channels, aggregated in multiple physical locations called cell sites across a specific area corresponding to a serving market and variously known in the United States under the designations MSA, RSA, MTA, and BTA depending on the FCC license.

A pair of entities known as the Home Location Register ("HLR") and Visited Location Register ("VLR") have been defined by the American National Standards Institute ANSI-41 standard, together with a set of protocols for communication between switches, which allows seamless roaming, or call delivery, to be made. In the present art, the VLR is associated with the wireless switch where a mobile unit is currently being served, and the HLR is associated with the switch where the mobile unit phone number "resides" (the geographic location where all hard-wired originated calls will be directed before being routed to a wireless switch with which the mobile unit is in communication).

Typically, when the VLR and HLR are physically in the same location, the mobile unit is "Home" and is not roaming. When the VLR and the HLR are not in the same location and specialized protocols are not implemented to make the mobile phone act as if it were "home", then the mobile unit is "roaming".

Phone calls from a mobile terminal to a land-based terminal can be completed while roaming only by a carefully orchestrated set of interactions between the HLR and VLR, all of which are described and defined by ANSI-41. ANSI-41 defines the HLR as a logically and possibly physically separate device from the actual switching matrix underlying the RF portion of the wireless network for the home location of the mobile unit. Similarly, the VLR is defined as a logically and possibly physically separate device from the actual switching matrix underlying the RF portion of the wireless network from which a mobile unit is currently being served. This physical separation, together with the Signaling System Seven (SS7) and the associated messages and protocols are existing underlying components utilized by the invention.

The mobile numbers associated with a mobile modem or mobile modem/phone combination acting as a mobile unit may be ones to which no physical geographic location have been assigned, or standard dialable numbers. The numbers will be placed in a HLR database by which they can be interacted with from the current VLR location by a mobile phone. The HLR used by this invention may be associated with a switch or have no associated switching matrix.

A mobile unit makes its presence known, either by Power-on Registration, Autonomous Registration, a Call Attempt or any other means. For the purpose of illustration, the mobile unit decides to make a call attempt to a known hard-wired modem connected to a land-based terminal. The request is made and it includes various pieces of information transmitted from the mobile unit to a serving switch connected to a base station usually located at the center of a geographical area defined as a cell site. The serving switch forwards the information to a local VLR. The VLR interacts with the HLR associated with the mobile phone for the purpose of reviewing the information and selectively obtaining authorization and feature/restriction data for serving the mobile unit. Issues related to appropriate authorization include, for example, whether billing payment is current or if the mobile phone has been reported lost or stolen.

The VLR provides the HLR with location information of the mobile unit 5 that may be based in part on a temporary local directory number ("TLDN") allocated from a pool of numbers whose geographic base is the physical location of the visited switch in direct communication with the mobile data unit.

The HLR sends back to the VLR any characteristic or limitation placed on the mobile unit and selectively authorizes call completion. If a call is authorized, the call along with any appropriate restrictions is communicated by the local VLR to the serving switch, which in turn outpulses the approved number being called over the public switch telephone network ("PSTN") to connect to a desired hard-wired modem.

Among the feature/restriction elements available for use by an HLR is a Single-Number, so-called "Hotline" restriction. When a Hotline restriction is placed on a mobile phone by its associated HLR, the mobile phone will be connected only to this number when any call attempt is made regardless of the dialed number. The switch containing the VLR routes the call via the public switched network to the Hotline number.

FIG. 1 illustrates the current state of the art for completing a long distance call from a mobile modem or a mobile modem/phone combination to a hard-wired modem in a remote location that corresponds to a long-distance call over the PSTN.

A mobile terminal 4 connected to a mobile modem or mobile modem/phone combination acting as a mobile unit 5 makes a call attempt to a land-based terminal 7 by way of a cell site 9 connected to a serving switch 11 connected to the cell site 9 by way of an internal connection 13. The serving switch 11 requests handling instructions over a connection 15 from the local visited location register ("VLR") 17. The VLR 17 examines the telephone number and other identifying information from mobile unit 5 and registers profile information from the home location register ("HLR") 21 associated with mobile unit 5 over a circuit 19 through one or more regional transfer points generally known as signal transfer points ("STP") 23. The HLR 21 authorizes, over a return circuit 25, the use of mobile phone/modem 5 to connect mobile station 4 to land-based terminal 7 by responding to the VLR 17 through the signal transfer point 23.

With appropriate authorization information, the VLR 17 replies over a circuit 27 to the switch 11 and authorizes the call. In turn, the switch 11 outpulses the dialed telephone number digits over a circuit 29 to the PSTN 31 and creates the required connection between the mobile terminal 4 connected to mobile unit 5 and hard-wire data unit 33 connected to the land-bed terminal 7. Thus, a data connection is finally established and the two end points 4 and 7 can communicate.

A key problem with the current state of the art is that there is a fairly significant fee charged for the use of the PSTN, particularly when long distance calls are being made. Moreover, data unit 33 must be associated with and physically connected to the land-based terminal 7 and physically connected to a pre-determined hard-wired landline.

SUMMARY OF THE INVENTION

In the improved telephone system of the present invention, a pool of geographically dispersed hard-wired data units such as modems are connected to an alternate network that is distinct from the traditional public switch telephone network. In a preferred embodiment, the alternate network is server controlled and uses the Internet protocol. A hard-wired land-based terminal is connected either directly or indirectly to the alternate network and may be accessed by means of the alternate network.

When a mobile data unit such as a mobile phone and modem combination connected to a mobile terminal such as a notebook computer initiates a long distance call to be connected to the land-based terminal, the signal information is sent to a serving switch of the wireless or mobile telephone system. The serving switch sends the signal information to a first register associated with a home location of the mobile data unit. The first register determines the authorization of the mobile data unit and also sends the signal information to a second register. If a long distance call has been requested by the mobile data unit, the first register determines a local number to use to access one of the hard-wired data units and substitutes the requested long-distance number with a local access number instead. The information is transmitted back to the second switch and used to set up the phone call made by the mobile data unit. When the phone call is made, access to the public switch telephone network is local. Once the mobile data unit is connected with the hard-wired data unit, the call is then carried through the alternate network to the land-based terminal unit, bypassing the public switch telephone network to the extent that a long distance charge would otherwise be incurred, and optimizing call delivery.

A further advantage of the inventive system is that it allows the local number determining algorithms associated with the hard-wired data units to exist outside of the terminal equipment, enabling rapid adaptation to changing network conditions to be made without reprogramming every mobile terminal.

BRIEF DESCRIPTIONS OF THE DRAWINGS

Figure 2:
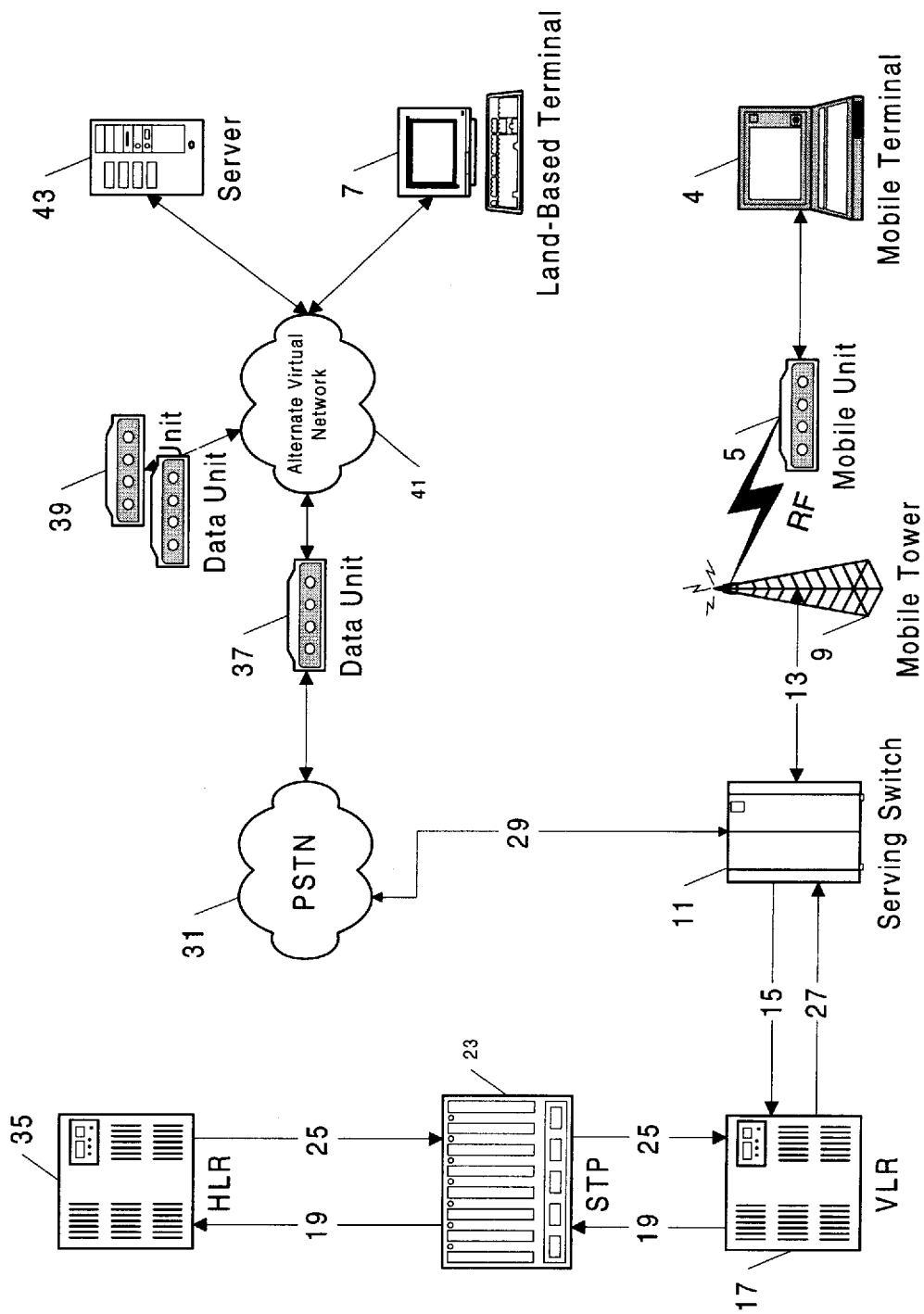

FIG. 1 is a Prior Art figure showing the current state of the art for connecting a mobile phone/modem to a remote land-based terminal using the public switched telephone system as a long distance call; and FIG. 2 shows the components of the inventive system using a pool of modems connected to a server controlled IP-network used to complete a connection between a mobile phone/modem and a remote land-based terminal using the public switched telephone system only for the purpose of making a local call.

DETAILED DESCRIPTION

In accordance with the present invention and referring to FIG. 2, a mobile terminal 4 wishes to establish a communication link with a land-based terminal 7. The process begins as discussed above with respect to FIG. 1. The mobile modem or mobile modem/phone combination acting as a mobile unit 5 connected to mobile terminal 4 makes a call attempt to the land-based terminal 7 by way of a cell site 9 connected to a visited switch 11. Switch 11 is connected to the cell site 9 by way of an internal connection 13. The visited switch 11 requests handling instructions over a connection 15 from the local visited location register ("VLR") 17. The VLR 17 examines the telephone number or other identifying information from mobile unit 5 and registers profile information from a home location register ("HLR") 35 associated with mobile unit 5 over a circuit 19 through one or more regional transfer points or signal transfer points ("STP") 23.

HLR 35 is different from the prior art HLR 21. HLR 35 takes advantage of one of the features available for use by a home location register related to a Single-Number, so-called "Hotline" restriction, discussed above. The HLR 35 may use one or more of a series of algorithms in reviewing information provided by VLR 17 to determine a different hard-wired number associated with a data unit such as a modem local to the physical location of mobile unit 5 as opposed to the use of a data unit such as a hard-wired data unit 33 that can only be reached by way of a long distance phone call on the public switched telephone network ("PSTN"). In addition to algorithms, the HLR 35 may include a look up table or either static or dynamic random access memory containing the desired hard-wired number information for a local hard-wired modem to be connected to a locally disposed mobile unit 5.

As noted above, the information transmitted from a VLR to an HLR includes at least limited information concerning the physical location of the mobile unit 5 This information comes in the message information known as the MSCID, which provides the identity of the serving switch. Given each switch has a known physical location and service area, a direct relationship from the serving MSC to the local modem pool location represented by a unique telephone number can be established.

Once a desired local hard-wired local modem number is determined by the HLR35 and all other authorization protocols are adequately satisfied, the HLR responds to the request of the VLR 17 with a profile including a "Hotline"

restriction. The "Hotline" restriction corresponds to the hard-wired number for the local modem and is used to direct the mobile unit 5 to the single desired number by selecting it from a predefined list based on the location of the visited cellular switch 11.

As illustrated in FIG. 2, the selected number associated with the "Hotline" restriction identifies a hard-wired number for a hard-wired data unit 37 such as a modem that typically is one of a pool of data units 39 associated as part of a hunt sequence, well known in the art. Hard-wired data unit 37 is local to serving switch 11, obviating any long distance charges between mobile unit 5 and the selected hard-wired data unit 37 to replace the connection to the hard-wired data unit 33 discussed with respect to FIG. 1. The authorization information, including the "Hotline" restriction, is returned from HLR 35 by way of circuit 25, regional transfer points 23, and VLR 17 to switch 11 authorizing the call. Switch 11 outpulses the restricted digits in place of the ones originally selected for the hard-wired number associated with data unit 33 to the public switched telephone network 31. In turn, the public switched telephone network 31 routes the call to locally accessible modem 37.

In turn, data unit 37 is locally or directly connected to a virtual network 41 utilizing a protocol such as Transmission Control Protocol over Internet Protocol ("TCP/IP"), which is controlled by one or more servers 43. Virtual network 41 is an alternate network that is not part of the public switch telephone network. It may actually comprise a number of interconnected networks capable of running the same protocol. Ideally, virtual network 41 is the Internet, the most ubiquitous TCP/IP based network. At the location of land-based terminal 7, it too is connected to virtual network 41 running either directly or by way of an intermediate data unit such as a modem. By using virtual network 41 it is possible to route data from terminal 4 to terminal 7 as a local phone call as opposed to a long distance call carried on the PSTN. Of note, the data transmitted may even include voice traffic as voice over protocols such as TCP/IP become more common.

Once the connection between the switched telephone network and the data unit 37 is established, the mobile unit 5 may use any number of existing protocols, such as WinSock to make a connection to land-based terminal 7, or, alternatively, to other land-based terminals [not shown], as decided by the application employed by the mobile terminal 4.

Though the invention has been described with respect to a specific preferred embodiment thereof, many variations and modifications will become apparent to those skilled in the art. It is therefore the intention that the appended claims be interpreted as broadly as possible in view of the prior art to include all such variations and modifications.

What is claimed is:

1. A telephone system comprising both hard-wired and wireless components for completing a telephone call for data transmission, said system having a register for examining the characteristics of a first telephone number entered into a mobile unit as part of a call origination, using said first telephone number to determine a desired location for call completion, and substituting a second telephone number for said first telephone number to provide an alternative data path for said call completion to said desired location represented by said first telephone number, said desired location being the same whether using said first telephone number or said second telephone number, wherein said register routes the telephone call to said alternative path if said register determines that said first telephone number represents a long distance call.

2. A telephone system as set forth in claim 1, wherein said register receives information concerning a current location of said mobile unit and compares said current location with said first telephone number to determine that said first telephone number represents said long distance call.

3. A telephone system as set forth in claim 1, wherein said register receives information concerning a current location of said mobile unit and uses said current location to generate said second telephone number.

4. A telephone system for enabling a local call over a public switch telephone network to be rerouted to a remote location, which would otherwise represent a long distance call, comprising:
   a mobile unit;
   a serving switch for receiving a long distance call from said mobile unit;
   a first data unit connected to the public switch telephone network local to said serving switch; and
   a register for responding to a long distance call made by said mobile unit and received by said serving switch, said register providing information to said serving switch about said first data unit and directing said serving switch to connect said mobile unit to complete the long distance call as a local call.

5. A telephone system as set forth in claim 4, wherein the geographical location of said serving switch determines said first data unit local to said serving switch to be selected.

6. A telephone system as set forth in claim 4, further comprising
   a plurality of second data units remote from said first data unit; and
   an alternative data path connected between said first data unit and one of said plurality of second data units.

7. A telephone system as set forth in claim 6, wherein said alternative data path includes the Internet protocol.

8. A telephone system as set forth in claim 6, in which said register has stored therein the identity of all of said plurality of second data units and said register can identify a specific second data unit local to said serving switch and direct said serving switch to connect said specific second data unit to complete the long distance call as a local call.

9. A telephone system for completing long distance calls as local calls over an alternative non-public switch telephone network comprising:
   switching means for interacting with a signal transmitted by a mobile unit requesting a long distance call;
   a plurality of geographically distributed data units connected to said switching means and to the alternative network; and
   register means for receiving a signal from said switching means and in response thereto selecting a specific data unit from said plurality of data units so that a long distance call can be completed as a local call through said specific data unit and connected alternative network.

10. A land-based telephone system for receiving and processing long distance telephone requests from a mobile unit comprising:
   means for receiving signal information from said mobile unit requesting a long distance telephone call; and means for processing said received signal information to determine the access number of a data unit connected to a non-public switch telephone network that is local to said means for receiving and for connecting said means for receiving to said data unit to complete a long distance call as a local call over said network.

11. A land-based telephone system as set forth in claim 10, wherein said data unit is in a pool of geographically dispersed data units all of which are connected to said network.

12. A land-based telephone system as set forth in claim 10, wherein said data unit is a modem and said network is an Internet protocol based network.

13. A land-based telephone system as set forth in claim 10, wherein said signal-receiving means is a serving switch and said processing means is a register.

14. A land-based telephone system as set forth in claim 13, wherein said register is associated with a home location register assigned to said mobile unit and said serving switch is assigned to a visited location register in selective communication with said home location register.

15. A method for one or more units receiving and processing long distance telephone requests from a mobile unit comprising:

said mobile unit sending a desired long-distance number;

receiving said long-distance number;

processing said long-distance number;

determining the access number of a data unit connected to a non-public switch telephone network that is local to said mobile unit;

altering said long-distance number to said access number;

sending said access number; and completing a local call to said data unit from said mobile unit.

\* \* \* \* \*